UNITED STATES PATENT OFFICE.

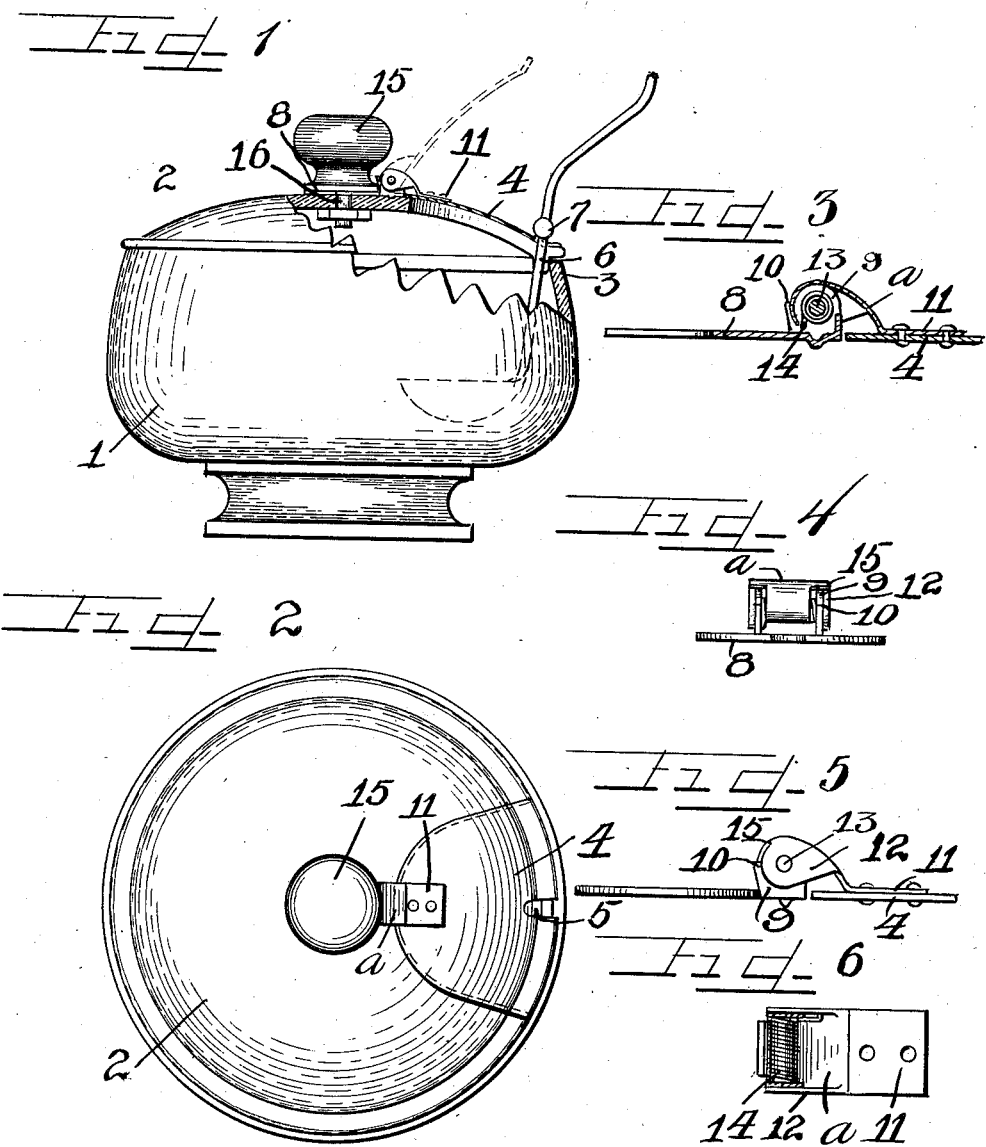

EDWARD T. LANGAN, OF CHICAGO, ILLINOIS.

COVER FOR DISPENSING-JARS.

1,079,942.   Specification of Letters Patent.   Patented Dec. 2, 1913.

Application filed July 5, 1912. Serial No. 707,682.

*To all whom it may concern:*

Be it known that I, EDWARD T. LANGAN, a citizen of the United States, and a resident of the city of Chicago, in the county of Cook and State of Illinois, have invented certain new and useful Improvements in Covers for Dispensing-Jars; and I do hereby declare that the following is a full, clear, and exact description of the same, reference being had to the accompanying drawings, and to the numbers of reference marked thereon, which form a part of this specification.

This invention relates to improvements in covers for dispensing jars and is shown more particularly embodied in connection with a dispensing jar such as those from which fruit syrups and the like are dispensed at soda fountains and elsewhere.

As heretofore constructed, such covers have usually been removed from the dispensing jar to permit a sufficient quantity of the contents of the jar to be ladled out, leaving the entire top of the jar uncovered during the operation, or sometimes but a section of the cover is removed. In either event, the dispenser sometimes forgets to close the jars, and in consequence a very unsanitary condition may obtain inasmuch as the jar being open, it exposes the contents to contamination from flies or other sources.

The object of this invention is to afford a construction in which the jar is at all times normally closed and in which the opening of the jar is effected by the raising of the lid.

While shown embodied as a dispensing jar, it is, of course, understood that the particular vessel or receptacle may assume any desired form and may be used for any preferred purpose.

It is a further object of this invention to provide a cover for containers having a segment of the same cut away and provided with a lid which is hinged to said cover to afford ready access to the interior of the container when said lid is in raised position.

The invention consists in the matters hereinafter described and more fully pointed out and defined in the appended claim.

In the drawings: Figure 1 is a side elevation of a device embodying my invention. Fig. 2 is a top plan view thereof. Fig. 3 is a longitudinal sectional view of the hinge connecting the lid with the cover. Fig. 4 is an end elevation of the same. Fig. 5 is a side elevation of the device shown in Fig. 3. Fig. 6 is a bottom plan view of that part of the hinge which is secured to the lid.

As shown in the drawings: 1, indicates a receptacle (in this instance shown as a dispensing bowl), the upper edge of which affords a seat for the fixed portion of the cover 2. Said fixed portion of the cover, as shown, is constructed preferably in one piece, and is shaped to conform with the top of the dispensing jar or vessel, and provided with a peripheral downwardly extending integral flange 3, adapted to fit within the edge of the jar or down over the top of the jar, as preferred, and as shown, is shaped to cover the entire jar or receptacle except for a segment of the top thereof. Said segment, of course, may vary in size as to its ratio with the entire top. As shown in the drawings, however, said segment is large enough to permit the insertion of a relatively large ladle into the receptacle when the lid 4, covering the same, is in raised position.

The lid or cover section 4, is hingedly connected to the cover 2, and is of a shape to fit accurately in the segmental space before described, to close the same. Said lid or cover plate 4, may or may not be flanged along its periphery to fit within the edge of the receptacle, as preferred, and is provided with a notch 5, to receive the handle 6, of the ladle or other dispensing instrument therethrough, and as shown, a projection 7, is provided on the handle of the ladle adapted to engage the edge of said cover to support the ladle partly thereon and thereby hold said cover section closed.

As shown in Fig. 3 a strap 8, is rigidly secured to the cover 2, and is provided with upwardly directed apertured lugs 9, each shaped to afford a shoulder 10, at the rear of the aperture in the same. A leaf spring 11, is secured to the lid 4, in any suitable manner and the end portion *a* thereof is curved upwardly, and then downwardly and is provided with depending apertured lugs 12, corresponding to the lugs 9. A pintle 13, extends through the apertures in the lugs 9 and 12, and articulates same together to afford a hinge, and a torsion spring 14, is engaged thereto in such a manner that it will raise the lid 4, when the ladle is removed from the receptacle and hold the same in raised position, as shown by dotted lines in Fig. 1, until the handle of the ladle is again engaged in the slot 5.

The engagement of the shoulder 15, against the complemental shoulder 10, on the lug 9, prevents the lid 4, from swinging back against the knob or handle 15, which is secured to the cover 2, by a bolt 16, or in any other suitable manner.

The operation is as follows: When in use, the handle 6 of the ladle is supported on the lid section 4, by means of the slight projection 7, on said handle, the weight of the ladle in part serving to hold said lid section tightly closed. When it is desired to remove any of the contents of the receptacle, the ladle is lifted, whereupon the cover section swings open to the position shown in dotted lines in Fig. 1, permitting one or more ladles of the contents to be removed. When the ladle is again returned to place, the projection 7 on the handle of the ladle is engaged in the notch in the edge of the folding cover section and the same is closed down thereby, the weight of the ladle serving to hold said folding cover section in closed position.

Of course, while I have shown the device as embodied in connection with a particular type of dispensing jar, it is to be understood that I do not purpose limiting the patent granted thereon, as obviously details of construction and application to use may vary within reasonable limits.

I claim as my invention:

A device of the class described, embracing a receptacle, a fixed cover section therefor having a segmental opening therethrough, a folding lid complemental with the segmental opening in the fixed cover section and hinged to the same, means adapted to force said lid to raised position, means adapted to limit the upward movement of the lid, said lid having a notch in its periphery to receive a ladle handle therethrough, a ladle, and a projection on the ladle handle adapted to engage the lid to hold the same normally closed against the tension of the opening means, the bowl of the ladle being disposed within the receptacle.

In testimony whereof I have hereunto subscribed my name in the presence of two subscribing witnesses.

EDWARD T. LANGAN.

Witnesses:
CHARLES W. HILLS, Jr.,
GEORGE R. MOORE.

---

Copies of this patent may be obtained for five cents each, by addressing the "Commissioner of Patents, Washington, D. C."